Aug. 17, 1954   M. L. CRIPE   2,686,651
VALVE DEVICE
Filed Jan. 8, 1951
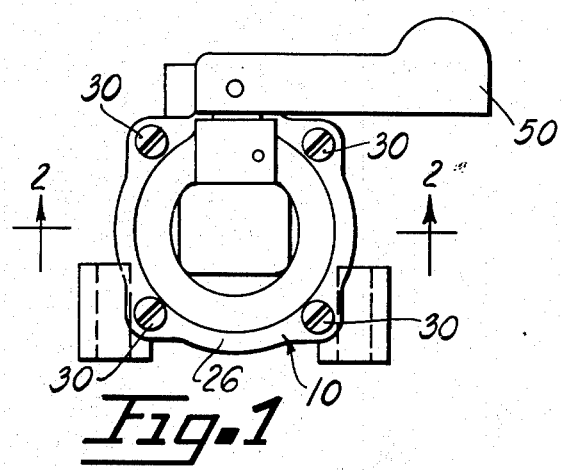
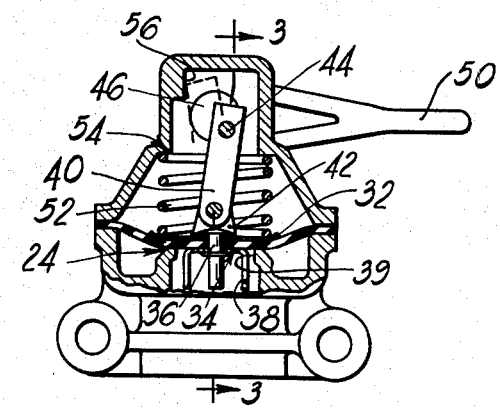
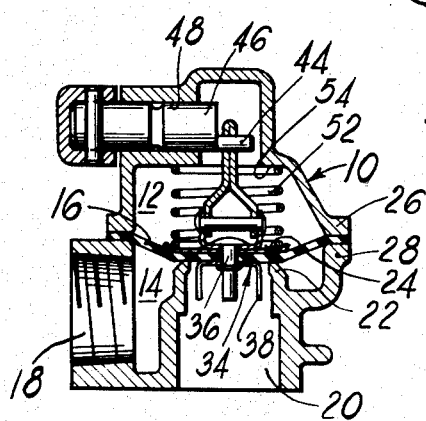
INVENTOR.
MAXWELL L. CRIPE
BY
ATTORNEY

Patented Aug. 17, 1954

2,686,651

UNITED STATES PATENT OFFICE 2,686,651

VALVE DEVICE

Maxwell L. Cripe, South Bend, Ind., assignor to Bendix Aviation Corporation, South Bend, Ind., a corporation of Delaware Application January 8, 1951, Serial No. 204,886

1 Claim. (Cl. 251—263)

The present invention relates to a valve and more particularly to a novel valve for use in an air pressure braking system for a tractor-trailer vehicle combination.

One conventional air pressure braking system utilizes as a power source, vacuum derived from the intake manifold of the tractor engine, which is communicated to the various braking units on both the tractor and trailer by means of suitable conduits. When the towing connection between the tractor and trailer is broken, it is obviously necessary to sever the conduit connections and to effectively shut off the tractor conduit to prevent the loss of the vacuum from the tractor braking system.

It is, therefore, an object of this invention to provide a manually operable valve for shutting off the tractor conduit, which is easily manipulated and which is positive in its operation. Further objects include the provision of self-aligning valve parts, a simple valve-sealing arrangement and means for positively holding the valve in either its open or closed position.

Other objects will become apparent as the description proceeds.

In the drawings:

Figure 1 is a top plan view of an embodiment of the present invention;

Figure 2 is a sectional view taken substantially on section line 2—2 of Figure 1; and Figure 3 is a sectional view taken substantially on section line 3—3 of Figure 2.

Referring to the drawings, a rigid casing 10 houses the valve parts, and is divided into two chambers 12 and 14 by a flexible air-tight partition or wall 16 formed of rubber or the like material. The casing 10 is provided in its lower portion with a laterally directed inlet 18 adapted for connection to a suitable source of vacuum such as an intake manifold, and a downwardly opening outlet 20 similarly adapted for connection to a conduit which leads to a trailer brake system, both inlet 18 and outlet 20 being adapted for communication with chamber 14. Outlet 20 is defined by means of an inwardly projecting hollow boss 22 which terminates at its inner end in an annular valve seat 24.

As illustrated, the casing 10 consists of two mating sections 26 and 28 fastened together by means of screws 30 to embrace therebetween the partition 16. This partition is centrally clamped between a spring-bearing plate 32 and a lug-bearing plate 34, these two plates 32 and 34 being firmly fastened together by any suitable means such as by means of the rivet 36. A plurality of lugs or depending fingers 38 are bent downwardly from the outer periphery of the plate 34 and serve to guide the partition 16 with respect to the port 39 surrounded by valve seat 24. It will be recognized at this point that the partition 16 may be characterized as a valve, since it may be moved into and out of sealing engagement with valve seat 24 to control communication between inlet 18 and outlet 20.

Movement of this valve 16 is controlled by means of a reciprocable link 40 which is pivotally secured at its lower end to a yoke 42 which is in turn secured to bearing plate 32 by means of the rivet 36. The upper end of the link 40 is pivotally connected to an eccentric projection 44 suitably carried by the end of a spindle 46, this spindle 46 being rotatably received in a transversely extending bore 48 in casing 10. This spindle and eccentric may be characterized as the valve actuator inasmuch as the operation thereof controls the position of the valve 16. A lever 50 may be secured to the outer end of the spindle 46 to facilitate operation of the valve.

A spring 52 acts against the bearing plate 32 and an annular shoulder 54 formed on the interior of casing 10 to constantly urge valve 16 to its illustrated closed position. By rocking lever 50 (see Figure 2) counterclockwise, the valve 16 is lifted off its seat 24 against the force of spring 52, and if this lever 50 is moved past top-dead-center of the eccentric 44, the spring 52 will tend to rotate the spindle toward valve closing position. However, stop 56 adjacent the spindle 46 and provided by the inner wall of casing 10 will be engaged by the upper end of link 40 (as is illustrated in Figure 2 by the dotted lines) and thereby limit the counterclockwise rotation of spindle 46 to a point where the valve 16 is spaced from its seat 24. Thus, by the co-action between stop 56 and spring 52, the valve 16 is positively held open. Positive closure of valve 16 is provided solely by the spring 52.

In use, the above described valve is conventionally mounted on the tractor of a tractor-trailer combination, and vacuum communication between the tractor and trailer braking systems is completed by rotating lever 50 counterclockwise until link 40 assumes its dotted line position of Figure 2. When it is desired to disconnect the trailer from the tractor, the lever 50 is merely flipped clockwise to its illustrated position, and valve 16 is seated on valve seat 24. The conduit connection to outlet 20 is then removed. Thus, by the closure of valve 16, the air at atmospheric pressure which now prevails at outlet 20 will be prevented from getting to inlet 18 and hence into the vacuum lines of the tractor system.

From the above description, it is obvious that manipulation of the handle 50 is rapid and easy, such manipulation being of the character of a flipping action. This latter characterization is attributable to the action of spring 52 which will positively move the valve 16 to either its opened or closed position depending upon which side of top-dead-center the eccentric 44 lies.

By using the flexible partition 16, the lower chamber 14 is simply and effectively sealed from the chamber 12 which can have leakage to atmospheric pressure. It will be appreciated at this point that this partition 16 serves dual functions as a valve and as an air-tight wall. As an air-tight wall, it bears a distinct advantage over prior art constructions which utilize suitable sealing members in combination with movable, rubbing parts. Obviously, the life of the sealing member of the prior art which is subjected to attrition is decidedly shorter than, for example, the seal of the present disclosure which is not subjected to the attrition of companion parts.

As a valve, partition 16 flexibly positions itself on valve seat 24 to positively seal the port 39 so that a slight wearing away of one valve surface will not interfere with the valve's sealing function.

Although only one embodiment of the invention has been illustrated and described, various changes in the form and relative arrangements of the parts may be made to suit requirements.

I claim:

A valve comprising a casing having an inlet and an outlet, a valve seat surrounding a port and disposed inside said casing, said port being interposed between said inlet and said outlet, a flexible air-tight partition fastened to the interior of said casing, said partition being arranged with respect to said valve seat to control the opening and closing of said port, a link pivotally connected at one end to said partition, a spindle rotatably mounted in said casing and having an eccentric projection extending axially outwardly from the end thereof which is pivotally connected to the other end of said link, a spring carried inside said casing and bearing on said partition in such a manner as to close said port, a plurality of lugs carried by said partition and extending into said port to align said partition with said port, a stop member formed on the interior of said casing as a unitary part thereof and adjacent said spindle and arranged to be engaged by said other end of said link upon rotating said spindle past top-dead-center whereby said partition will be spaced from said valve seat and open said port.

References Cited in the file of this patent

UNITED STATES PATENTS

| Number | Name | Date |
|---|---|---|
| 780,929 | Angehr | Jan. 24, 1905 |
| 1,804,586 | Belknap | May 12, 1931 |
| 1,990,635 | Buttner | Feb. 12, 1935 |
| 2,034,420 | Reiland et al. | Mar. 17, 1936 |
| 2,227,914 | Saunders | Jan. 7, 1941 |
| 2,362,631 | Harris | Nov. 14, 1944 |
| 2,515,159 | Zurcher | July 11, 1950 |